United States Patent [19]
Ward et al.

[11] 3,950,054
[45] Apr. 13, 1976

[54] ADAPTER BRACKET FOR CONNECTING BLOCKS

[75] Inventors: Ronald C. Ward; James M. Love, both of Huntsville, Ala.

[73] Assignee: GTE Automatic Electric Laboratories Incorporated, Northlake, Ill.

[22] Filed: Nov. 7, 1974

[21] Appl. No.: 521,599

[52] U.S. Cl.................. 339/36; 339/198 J; 220/3.9; 248/223
[51] Int. Cl.[2].. A47F 5/08; H01R 13/46; H02G 3/10
[58] Field of Search............. 339/36, 37, 39, 75–79, 339/82, 198 J; 174/66, 67; 220/3.9; 248/73, 223, 224

[56] References Cited
UNITED STATES PATENTS

| | | | |
|---|---|---|---|
| 1,774,934 | 9/1930 | Mangin | 220/3.9 X |
| 2,913,210 | 11/1959 | Tichnor | 248/223 |
| 2,991,968 | 7/1961 | Lydard | 248/223 |
| 3,040,926 | 6/1962 | Palmer | 220/3.9 |
| 3,536,281 | 10/1970 | Meehan et al. | 248/223 X |
| 3,588,019 | 6/1971 | Cozeck et al. | 220/3.9 X |

Primary Examiner—Joseph H. McGlynn
Assistant Examiner—Craig R. Feinberg
Attorney, Agent, or Firm—David W. Heid; Robert J. Black

[57] ABSTRACT

A generally U-shaped adapter bracket is disclosed for use in converting a conventional surface mounted telephone connecting block into a connecting block having a cover which includes a jack for receiving a plug-ended line cord. The adapter bracket includes a plurality of apertures in its rear surface to provide capability of using it with various conventional connecting blocks. Communicating passageways from the edge of the bracket to the apertures are provided to allow installation of the bracket over a connecting block without removing the connecting block from its wall-mounted position.

3 Claims, 8 Drawing Figures

ADAPTER BRACKET FOR CONNECTING BLOCKS

BACKGROUND OF THE INVENTION

This invention is related generally to the field of telephone substation equipment, and more particularly to a bracket for use in converting a surface-mounted connecting block into one which receives a cover which includes an electrical jack.

In the prior art connecting blocks the conductors from the telephone set must be manually wired to screw-type terminals in the connecting block, which normally requires the assistance of a telephone installer. With the emphasis currently shifting to providing telephone substation equipment in which the user may install the telephone set himself, it is desirable to provide surface mounted connecting blocks with built in jacks into which a plug-ended line cord from the subscriber set may be inserted or removed by the user and thus eliminate the necessity of a service call by a telephone installer. It is desirable to convert the conventional connecting block to one which includes an integral jack arrangement without completely eliminating the existing connecting block.

SUMMARY OF THE INVENTION

In order to convert a conventional connecting block into one which can receive a plug-ended line cord without completely replacing the existing connecting block, an adapter bracket is provided which is adapted to be installed on existing connecting blocks. This adapter bracket provides convenient apparatus for attaching a protective cover, which includes an electrical jack, to the base portion of a conventional connecting block.

The adapter bracket of the present invention includes apertures in the base portion thereof which are positioned to overlay the mounting apertures of existing connecting blocks. Communicating passageways from the edge of the bracket to the apertures are also included on the bracket. The front portion of the adapter bracket includes a tongue having an aperture to receive a fastening means, such as a threaded screw, to hold the protective cover with integral jack to the adapter bracket.

DESCRIPTION OF THE PREFERRED EMBODIMENT

The bracket of the present invention is designed as an aid to modifying conventional telephone connecting blocks which conventionally require hand wiring from the block to the telephone instrument. A typical conventional telephone connecting block is illustrated in U.S. Pat. No. 3,106,602, issued Oct. 8, 1963, to J. M. Hartz. As illustrated in this patent, hereinafter referred to as the '602 patent, the connecting block includes an integral cover and a plurality of terminals for receiving the station wire and for connecting the cable to the telephone subset. The adapter bracket of the present invention as primarily adapted to be employed with the connecting block of the foregoing patent, however as will be pointed out later herein, the adapter bracket may also be used with other conventional connecting blocks.

Figure 1:
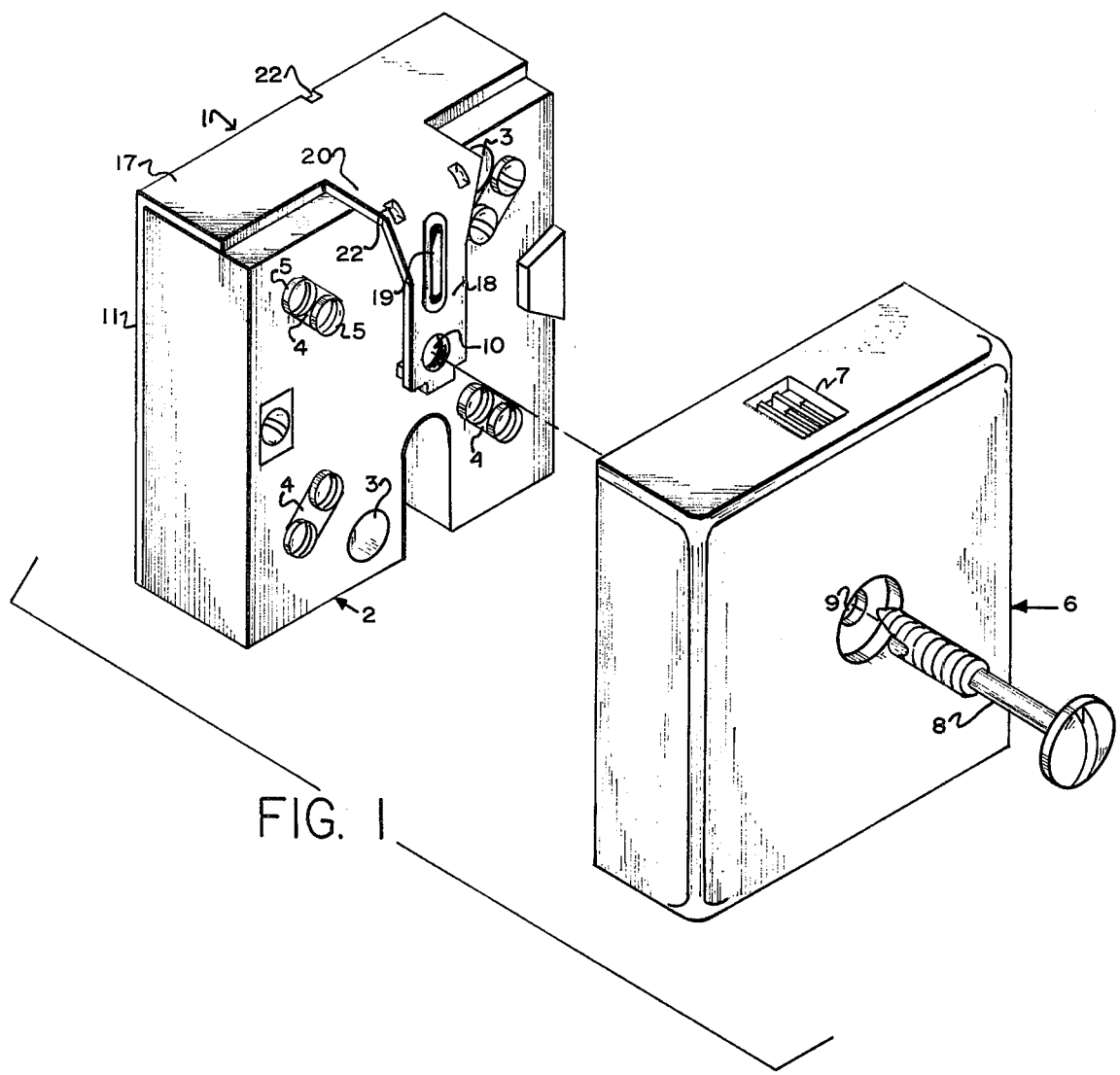
FIG. 1 is a perspective view of the bracket of the present invention, installed over a telephone connecting block, a jack cover assembly, and a mounting screw therefor spaced apart from the connecting block.

In FIG. 1, adapter bracket 1 is illustrated in position over connecting block 2 of the type corresponding to that illustrated in U.S. Pat. No. 3,106,602. Connecting block 2 is conventionally mounted on a wall and secured thereto by appropriate mounting means which are inserted through openings 3 of connector block 2. As will be appreciated by comparision of connector block 2 with that of the above mentioned patent, connector block 2 has been modified by removing the integral cover and the cord hook post which are illustrated in the patented connecting block. However, connecting block 2 in every other respect remains unchanged, and included terminals 4 and screws 5 which are received by threaded openings in terminals 4.

By modifying the connector block of the '602 patent in the manner noted above and using exemplary adapter bracket 1, jack cover assembly 6, which includes integrally therewith jack 7 which is adapted to receive a plug-ended line cord from a telephone subset, may be installed over block 2 and adapter bracket 1. Electrical conductors, not illustrated, are utilized to make electrical connections between jack 7 and the appropriate terminals 4 of connecting block 2. Threaded screw 8 is employed to extend through opening 9 of jack cover assembly 6 and be received in threaded opening 10 of adapter bracket 1 to hold jack cover assembly 6 into place over connecting block 2 and adapter bracket 1. Thus it will be appreciated that by installing jack cover assembly 6 on connecting block 2, a connecting block is provided which is adapted to receive a plug-ended line cord to permit a telephone user to connect a telephone subset to the modified block and place the telephone in service.

Figure 2:
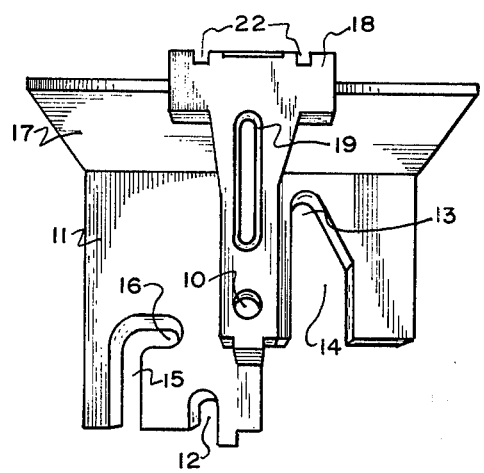
FIG. 2 is a perspective view of the bracket of the present invention.
Figures 3, 4:
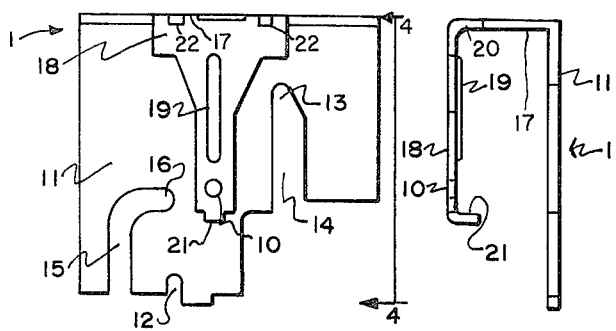
FIG. 3 is a front plan view of the bracket of the present invention.
FIG. 4 is a view taken along the lines 4—4 of FIG. 3.
Figure 5:
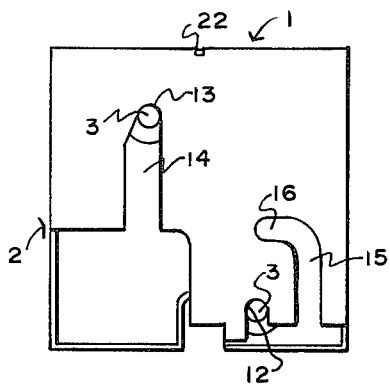
FIG. 5 is a view taken along the lines 5—5 of FIG. 1, but excluding the jack cover assembly.

Referring to FIGS. 2 and 3, the bracket of the present invention is illustrated in detail therein. Adapter bracket 1 has been designed to provide easy installation thereof over conventional connecting blocks without the necessity of removing the blocks from the mounting surface. For example, to install adapter bracket 1 over connecting block 2 it is only required that the fastening means which are inserted through openings 3 be loosened a sufficient amount to allow base portion 11 to slip behind the rear surface of connecting block 2. In utilizing adapter bracket 1 with connecting block 2, installation is accomplished by placing adapter bracket 1 directly above connecting block 2 and sliding adapted bracket 1 directly downward. The final resting position of adapter bracket 1 when installed over connecting block 2 is illustrated in FIGS. 1 and 5. Returning to FIGS. 2 and 3, it will be noted that base portion 11 includes apertures 12 and 13, these apertures being utilized when adapter bracket 1 is positioned over connecting block 2. It will be noted from FIG. 5 that apertures 12 and 13 overlay openings 3 of connecting block 2 and hence the retaining means, not shown, which are inserted through openings 3 of connecting block 2 to hold connecting block 2 in a wall-mounted position will also retain adapter bracket 1 in the position illustrated in FIG. 5. To provide the easy installation of adapter bracket 1 over connecting block 2 referred to previously herein, a communicating passageway 14 is provided from the lower edge of adapter bracket 1 up to aperture 13. Communicating passageway 14 allows adapter bracket 1 to slide downward over the mounting means for connecting block 2 without the necessity of completely removing the mounting means and hence the connecting block from its wall-mounted position. It will be noted in FIGS. 2 and 3 that a second communicating passageway 15 is provided in base portion 11 leading to aperture 16 which is utilized when installing adapter bracket 1 over another type of connecting block. Utilization of aperture 16 and second communicating passageway 15 will be illustrated later herein with reference to FIGS. 6 through 8.

Returning to FIGS. 1–3, adapter bracket 1 further includes intermediate portion 17 which extends forward from the upper edge of base portion 11, outward a sufficient length to pass the front edge of connecting block 2 and at that point tongue portion 18 extends downward in front of connecting block 2. As noted previously herein, tongue portion 18 includes threaded opening 10 at its lower end to receive threaded screw 8 to secure jack cover assembly 6 in place over adapter bracket 1 and connecting block 2. It will also be noted in FIGS. 1, 2, and 3, that tongue portion 18 includes embossed rib 19 to provide stiffening to tongue portion 18. Intermediate portion 17 includes as a part thereof reduced section 20, which lies in the same plane as intermediate portion 17, reduced section 20 forming a transition portion between intermediate portion 17 and the point where tongue portion 18 extends downward.

It will of course be appreciated that intermediate portion 17 could extend in full width to the upper end of tongue portion 18, however reduced section 20 is of sufficient strength to hold tongue portion 18 in rigid relationship to the remainder of adapter bracket 1. As can best be seen in FIG. 4, adapter bracket 1 includes on the free end of tongue portion 18 an inwardly extending tip 21. With adapter bracket 1 positioned over connecting block 2 as illustrated in FIG. 1, tip 21 rests on the surface of connecting block 2 and provides support to tongue 18.

It will be appreciated by those skilled in the art that adapter bracket 1 may be formed of various types of materials, however it has been found that strip steel is a most suitable material, and when forming the bracket it has been found desirable to gusset adapter bracket 1 at the transition points between base portion 11 and intermediate portion 17 and also between tongue portion 18 and reduced section 20, the gusseting points being designated at 22. It will also be appreciated by those skilled in the art that tongue portion 18 may include other retaining means at its tip in place of threaded opening 10 for receiving a jack cover assembly attaching means. Furthermore, base portion 11 could of course include only apertures 12, 13, and 16 without communicating passageways 14 and 15, and still be suitable for its intended purpose. Elimination of communicating passageways 14 and 15 would merely mean that the mounting means for the connecting block with which bracket 1 is being used would have to be removed from the wall, adapter bracket 1 placed in position over the block and then the fastening means for holding a connecting block to the wall reinserted through the connecting block and the overlaying apertures in adapter bracket 1.

Figure 6:
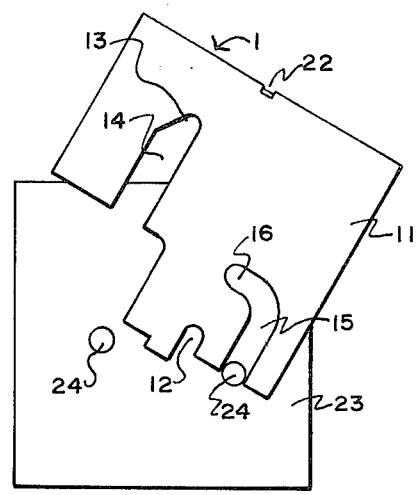
FIGS. 6 through 8 are rear plan views of the bracket of the present invention illustrating the manner in which the bracket is installed upon another style telephone connecting block.
Figure 7:
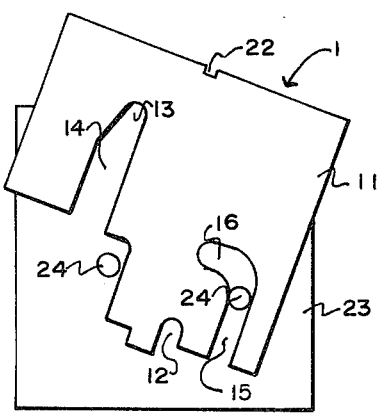
Figure 8:
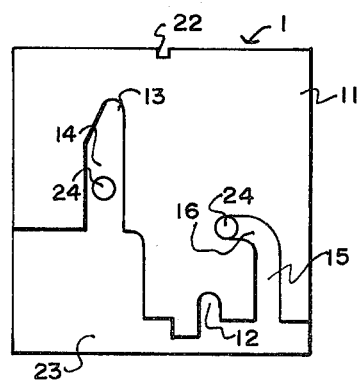

Adapter bracket 1 also finds unique application to the Minnesota Mining and Manufacturing Company telephone connecting block having their type designation of number 4110. FIGS. 6 through 8 illustrate how adapter bracket 1 may be moved into its final operative resting position, which is that disclosed in FIG. 8, without the necessity of removing the mounting means for connector block 23, which corresponds to the number 4110 block, from the wall. Connector block 23 is illustrated in FIGS. 6 through 8 as it would be viewed from behind the wall, that is in the same relative view as that of connecting block 2 illustrated in FIG. 5. Connector block 23 includes openings 24 through which suitable mounting means are passed to secure connector block 23 into a wall-mounted position. To install adapter bracket 1 over connector block 23, it is first necessary to loosen the connector block fastening means, which would pass through openings 24, to allow connector block 23 to be moved away from the wall a distance just slightly greater than the thickness of base portion 11 so that adapter bracket 1 may slide between the wall surface and the rear surface of connector block 23. Once this has been accomplished, adapter bracket 1 is initally moved to the position illustrated in FIG. 6, wherein the right hand opening 24 is positioned in the lower end of second communicating passageway 15 which leads to aperture 16. The fastening means which would pass through openings 24 have been eliminated for simplicity, however it will be appreciated that in installing adapter bracket 1 over connector block 23 that this can be accomplished by merely providing passageways which allow adapter bracket 1 to be moved into position without interference between the fastening means and base portion 11.

In FIG. 7 adapter bracket 1 is illustrated in process of being installed over connector block 23, and it will be observed that in this position adapter bracket 1 has been moved downward and to the right as illustrated by the arrow on FIG. 7. Continued movement in a like manner, as illustrated in FIG. 7, continuing downward and to the right will ultimately position adapter bracket 1 as illustrated in FIG. 8. It will be noted that adapter bracket 1 has come to rest such that the right hand opening 24 therein is positioned in aperture 16 of adapter bracket 1 and left hand opening 24 of connector block 23 positioned in communicating passageway 14. With adapter bracket 1 in its final resting position as illustrated in FIG. 8, the fastening means for connector block 23 may then be retightened to secure connector block 23 and adapter bracket 1 to the wall. With this accomplished, jack cover assembly 6 may then be assembled to the front of connector block 23-adapter bracket 1 combination and hence provide a modified connecting block with integral jack 7 included therein.

It will be appreciated by those skilled in the art that adapter bracket 1 could be modified to interface with connector block 23 by merely providing aperture 16 without passageway 15 and a second aperture appropriately placed to coincide with the final resting point of left hand opening 24 in connector block 23, and hence eliminate communicating passageways 14 and 15. This will of course require in the installation of adapter bracket 1 to connector block 23 that the fastening means which pass through openings 24 would have to be completely removed from the wall before placing adapter bracket 1 over connecting block 23.

It is to be understood that while the present invention has been shown and described with reference to the preferred embodiment thereof, the invention is not limited to the precise forms set forth, and that various modifications and changes may be made therein without departing from the spirit and scope of the present invention.

What is claimed is:

1. A bracket for a terminal block having openings therethrough for receiving mounting means to hold said block to a mounting surface, said bracket providing means for securing a cover to said terminal block, said bracket comprising:

a base portion having apertures therein positioned to overlay said openings in said terminal block, said base portions generally rectangular shaped, including passage-ways extending from one edge thereof to said apertures and one of said passage-ways extending upward from the lower edge of said base portion along the line parallel to one side of said base portion for a predetermined distance and then curved toward the center of said base portion prior to terminating at one of said apertures;

an intermediate portion extending outward from one edge of said base portion; and a tongue portion extending downward from said intermediate portion, said tongue portion including means for receiving a cover attaching means for securing said cover to said bracket and hence over said terminal block.

2. The bracket as claimed in claim 1 wherein said tongue includes on the free end thereof an inwardly extending tip.

3. The bracket as claimed in claim 1 wherein said tongue includes an embossed rib for adding rigidity thereto.

* * * * *